United States Patent [19]

Winbow et al.

[11] Patent Number: 4,774,693

[45] Date of Patent: Sep. 27, 1988

[54] SHEAR WAVE LOGGING USING GUIDED WAVES

[75] Inventors: Graham A. Winbow, Houston; Sen-Tsuen Chen, Sugarland; James A. Rice, Houston, all of Tex.

[73] Assignee: Exxon Production Research Company, Houston, Tex.

[21] Appl. No.: 454,925

[22] Filed: Jan. 3, 1983

[51] Int. Cl.$^4$ ............................................. G01V 1/00
[52] U.S. Cl. ...................................... 367/27; 367/31; 367/75
[58] Field of Search .................... 367/31, 29, 75, 25, 367/86, 27; 181/102; 364/422

[56] References Cited

U.S. PATENT DOCUMENTS

| | | | |
|---|---|---|---|
| 2,209,100 | 7/1940 | Minton | 367/43 |
| 3,325,780 | 6/1967 | Horan | 367/164 |
| 3,330,375 | 7/1967 | White | 367/29 |
| 3,583,677 | 6/1971 | Phillips | 367/162 |
| 3,593,255 | 7/1971 | White | 367/912 |
| 3,821,740 | 6/1974 | Ehrlich | 367/100 |
| 3,992,693 | 11/1976 | Martin et al. | 367/155 |
| 4,131,875 | 12/1978 | Ingram | 367/35 |
| 4,207,961 | 6/1980 | Kitsunezaki | 181/106 |
| 4,293,934 | 10/1981 | Herolz et al. | 367/27 |
| 4,419,748 | 12/1983 | Siegfried, II | 367/31 |
| 4,575,830 | 3/1986 | Ingram et al. | 367/26 |
| 4,606,014 | 8/1986 | Winbow et al. | 367/75 |
| 4,649,525 | 3/1987 | Angona et al. | 367/31 |

FOREIGN PATENT DOCUMENTS

| | | | |
|---|---|---|---|
| 0031989 | 7/1981 | European Pat. Off. | |
| 996964 | 2/1983 | U.S.S.R. | 118/113 |
| 1534854 | 12/1978 | United Kingdom. | |
| 2071847A | 9/1981 | United Kingdom. | |
| 2090975A | 7/1982 | United Kingdom. | |

OTHER PUBLICATIONS

Hardee, Downhole Periodic Seismic Sources, 1983 pp. 57-71.

Cheng et al, "Elastic wave propagation in a fluid filled borehole and synthetic acoustic logs" Geophysics vol. 46, No. 7 (Jul. 1981) pp. 1042-1053.

Pickett, "Acoustic Character Logs and Their Applications in Formation Evaluation" paper presented at 37th Annual Fall Meeting of SPE Oct. 7-10, 1962 in Los Angeles, Calif., pp. 659-667.

Biot, "Propagation of Elastic Waves in a Cylindrical Bore Containing a Fluid," Journal of Applied Physics, vol. 23, No. 9, Sep. (1952) pp. 997-1005.

Tsang et al, "Numerical evaluation of the transient acoustic waveform due to a point source in a fluid filled borehole" Geophysics vol. 44 No. 10 (Oct. 1979) pp. 1706-1720.

Kitsunezaki; "A new method for shear-wave logging" Geophysics, vol. 45, No. 10, Oct. (1980) pp. 1489-1506.

Ogura et al, "Development of the Suspension S-Wave Logging System, OYO Corporation Technical Note, Nov. (1980) pp. 1-20.

Adam Gawin, "Theoretical Basis of Quadrupole Well Logging", Acta Geophysica Polonica, vol. 19, No. 2, 1971, pp. 181-204.

"Wave Propagation Along a Cylindrical Borehole in a Transversely Isotropic Medium", by Chalermkiat Tongtaow, Ph.D. thesis T-2682, submitted Oct. 29, 1982 to the Faculty and the Board of Trustees of the Colorado School of Mines.

Primary Examiner—Thomas H. Tarcza
Assistant Examiner—Daniel T. Pihulic

[57] ABSTRACT

The shear wave velocity of the formation is determined by logging the fastest component of the guided wave generated by the generating means. This method is advantageous for logging the shear wave velocities of soft formations. If the generating means of a multipole acoustic logging device radiates at frequencies including a critical frequency, the fastest component of the guided wave generated by the generating means will have substantially the same velocity as a shear wave traveling in the earth formation. By logging the velocity of this fastest component, the shear wave velocity of the earth formation is determined.

10 Claims, 3 Drawing Sheets

SHEAR WAVE LOGGING USING GUIDED WAVES

This invention relates to well logging in general and more particularly, to acoustic shear wave well logging using guided waves.

BACKGROUND OF THE INVENTION

In acoustic well logging, it is customary to measure the compressional wave velocity of earth formations surrounding boreholes. A conventional compressional wave velocity logging system includes a cylindrical logging sonde suitable for suspension downhole in a borehole liquid, a source connected to the sonde for generating compressional waves in the borehole liquid, and one or more detectors connected to the sonde and spaced apart from the compressional wave source for detecting compressional waves in the borehole liquid. A compressional wave in the borehole liquid generated by the source is refracted into the earth formation surrounding the borehole. It propagates through a portion of the formation and is refracted back into the borehole liquid at a point adjacent to the detector and is then detected by the detector. The ratio of the distance between the source and detector to the time between generation and detection of the compressional wave yields the compressional wave velocity of the formation. Information important for production of oil and gas from subterranean earth formations may be derived from the compressional wave velocities of such formations.

When a compressional wave generated by a compressional wave source in the borehole liquid reaches the borehole wall, it produces a refracted compressional wave in the surrounding earth formation as described above. In addition, it also produces a refracted shear wave in the surrounding earth formation, and a guided wave which travels in the borehole liquid and part of the formation adjacent to the borehole. In hard formations where the shear wave velocities of the formations are greater than the velocity of sound in the borehole liquid, part of such shear wave is refracted back into the borehole liquid in the form of a compressional wave and reaches the detector in the logging sonde. The guided wave is also detected by such detector. Any wave that is one of the three types of waves detected by the detector may be called an arrival: the compressional waves in the borehole liquid caused by refraction of compressional waves in the formation the compressional wave arrivals, those caused by refraction of shear waves in the formation the shear wave arrivals, and those caused by guided waves the guided wave arrivals. Thus, the signal detected by the detector is a composite signal which includes the compressional wave arrival, the shear wave arrival and the guided wave arrival. Compressional waves travel faster than shear waves and shear waves usually travel faster than the guided waves. Therefore, in the composite signal detected by the detector, the compressional wave arrival is the first arrival, the shear wave arrival the second arrival, and the guided wave arrival the last arrival.

It is well known that shear wave velocity logging may also yield information important for production of oil and gas from subterranean earth formations. The ratio between the shear wave velocity and compressional wave velocity may reveal the rock lithology of the subterranean earth formations. The shear wave velocity log may also enable seismic shear wave time sections to be converted into depth sections. The shear wave log is useful in determining other important characteristics of earth formations such as shear stress, porosity, fluid saturation and the presence of fractures. The shear wave log may also be helpful for determining the stress state around the borehole which is very important in designing hydraulic fracture treatments.

Asymmetric compressional wave sources have been developed for logging shear wave velocity. Using such sources, the amplitude of the shear wave arrival may be significantly higher than that of the compressional wave arrival. By adjusting the triggering level of the detecting and recording systems to discriminate against the compressional wave arrival, the shear wave arrival is detected as the first arrival. It may thus be possible to determine the travel time of shear waves in the formation and therefore the shear wave velocity. Asymmetric sources are disclosed by Angona et al, European patent application No. 31989 and White, U.S. Pat. No. 3,593,255.

In soft formations, such as near surface formations or the Gulf Coast soft shale, the shear wave velocities of such formations are frequently less than the velocity of sound in the borehole liquid.

According to Snell's Law, where the shear wave velocity of the formation is less than the sound velocity in the borehole liquid, the shear waves refracted into the formation will travel away from the borehole, and will not be refracted back into the borehole liquid to reach the detector. Angona et al and White have not disclosed how shear wave velocities may be logged in such circumstances.

Kitsunezaki in U.S. Pat. No. 4,207,961 discloses a device for logging the shear wave velocity of a soft formation. Coils are mounted on a bobbin assembly which is then placed in the magnetic field of a permanent magnet. A current pulse is passed through the coils to drive the bobbin assembly. The movement of the bobbin assembly ejects a volume of water in one direction and simultaneously sucks an equivalent volume of water from the opposite direction. Through the medium of water, the movement of the bobbin indirectly pushes a portion of the borehole wall and pulls another portion on the other side of the bobbin assembly. Such excitation imparted to the borehole wall will generate shear waves in soft formations which are detected at points in the borehole liquid vertically spaced from the bobbin assembly.

The U.S. Pat. No. 4,207,961 to Kitsunezaki has been assigned to OYO Corporation of Tokyo, Japan. In an OYO Technical Note dated November 1980 and entitled, "Development of the Suspension S-wave Logging System," by Ogura, Nakanishi and Morita, a solenoid type electromagnetic exciter for generating shear waves is disclosed which appears to be the same as the device disclosed in U.S. Pat. No. 4,207,961. In the Note, it is stated that the solenoid type excitor shear wave logging system can be used to measure shear wave velocites up to speeds of around 1 km/sec. or 3000 ft/sec. Thus it appears that the device disclosed by Kitsunezaki may not be capable of logging shear wave velocities above 3000 ft/sec. The Note further states that data from experiments using such system show that the observed shear wave amplitude falls off dramatically with increases in shear wave velocity of the formation, and that at shear wave velocities as low as 450 m/sec. or about 1350 ft/sec., the observed shear wave amplitude become extremely small. Hence it may even be difficult to use such device to log shear wave velocities between 1350 ft/sec. and 3000 ft/sec. In the article "A New Method for Shear-Wave Logging", Geophysics Vol. 45, No. 10 (October 1980) pp. 1489-1506, Kitsunezaki described a logging device which appears to be the same as the device of U.S. Pat. No. 4,207,961. Kitsunezaki, on page 1500 of the article, stated that the driving mechanism of such logging device has problems in logging formations with higher shear wave velocities.

It also appears that Kitsunezaki's device must be stationary while it is being used for generating shear waves in earth formations in the manner described above. This requirement will slow down the logging process. It will also increase the likelihood of the logging device being trapped in the well and the likelihood of losing the device.

BRIEF DESCRIPTION OF THE DRAWINGS

FIGS. 1 through 8 are for illustrative purposes only and are not drawn to scale.

SUMMARY OF THE INVENTION

The shear wave velocity of the formation may be determined by logging the fastest component of a guided wave, said component having substantially the same velocity as that of the shear wave in the formation. In such method a guided wave is generated in the borehole liquid wherein the fastest component of the guided wave has substantially the same velocity as the shear wave in the formation. The arrival of such fastest component is detected at at least one location in the liquid spaced longitudinally along the borehole from the location where the guided wave is generated. The velocity of the fastest component of the guided wave, which is substantially the same as the shear wave velocity of the formation, may be determined.

DESCRIPTION OF THE PREFERRED EMBODIMENTS

Where the shear wave velocity of the formation surrounding the borehole is less than the sound velocity in the borehole liquid, the shear wave produced in the formation caused by refraction of compressional waves in the borehole liquid will travel away from the borehole and will never reach the detector in the borehole. Therefore, in such circumstances, it may not be possible to log the shear wave velocity directly. The Applicants have discovered, however, that when a multipole source, whether it is dipole, quadrupole, octopole or a higher order multipole, is used to generate compressional waves in the borehole liquid, the compressional waves, upon reaching the borehole wall, will generate a dispersive guided wave. The guided wave velocity depends in a complicated way on the sound velocities in the borehole liquid and the formation, the frequency of the wave, and the shape and size of the borehole. If the multipole source radiates at frequencies including a critical frequency (to be explained later), the fastest component of the guided wave so generated will have substantially the same velocity as the shear wave. Therefore, by detecting the arrival of this fastest component of the guided wave the shear wave velocity of the formation can be obtained. The shear wave velocity of a formation may be logged in this manner irrespective of whether the shear wave velocity of the formation is greater or less than the velocity of sound in the borehole liquid. This method may be used to log the shear wave velocities of hard as well as soft formations.

In most soft formations the guided wave generated by a conventional symmetrical source has components whose velocities are all lower than the shear wave velocity. Therefore in most soft formations where shear wave velocities are less than the sound velocity in the borehole liquid, only multipole sources may be used for shear wave velocity logging.

Figures 1, 2:
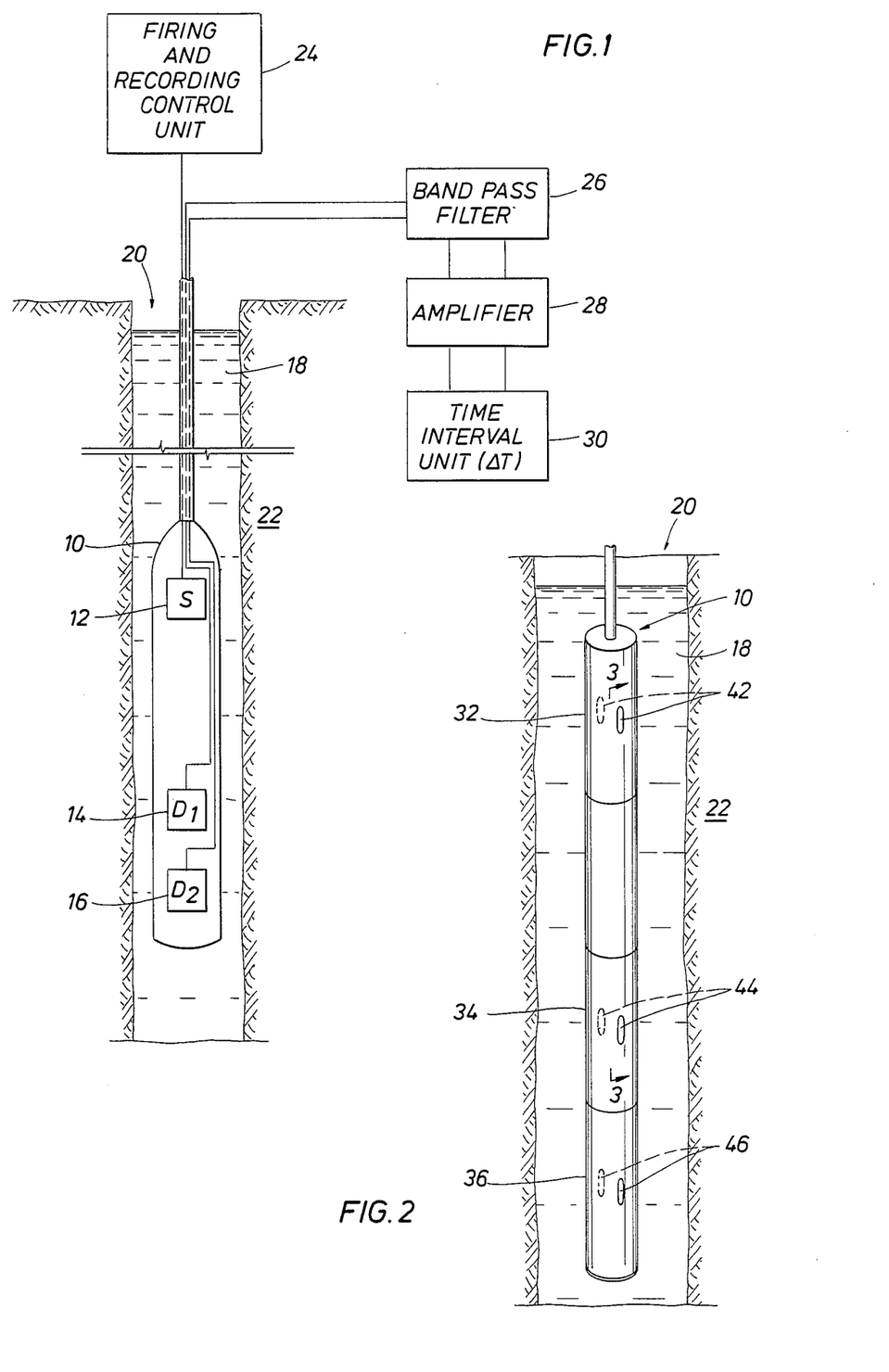
FIG. 1 is a schematic view of an acoustic logging system which may be used to log the shear wave velocity of an earth formation by logging the velocity of a guided wave.
FIG. 2 is a simplified perspective view of a dipole acoustic logging device which may be used to log the shear wave velocity of an earth formation by logging the velocity of a guided wave.

FIGS. 1 through 8 illustrate acoustic logging systems employing different multipole logging sources which may be used to log the shear wave velocities of earth formations by logging the velocity of a guided wave. FIG. 1 is a schematic view of an acoustic logging system which may be used to determine the shear wave velocities of earth formations. A logging sonde 10 is adapted to be raised and lowered into a well. The sonde contains a multipole acoustic source 12 and two detectors, 14, 16. To initiate logging, sonde 10 is suspended into a liquid 18 contained in a borehole 20, which is surrounded by an earth formation 22. Detectors 14, 16 are so connected to sonde 10 that they are spaced longitudinally along borehole 20 from each other and from source 12. Source 12 is connected to a firing and recording control unit 24. Signals recorded by detectors 14, 16 are fed to a band pass filter 26, an amplifier 28 and a time interval unit 30.

In a manner explained below the firing and recording control unit is used to fire source 12 which produces a guided wave in liquid 18 and formation 22. The guided wave arrival is detected by detectors 14 and 16, filtered by filter 26 and amplified by amplifier 28. The time interval between the detection of the arrival by detector 14 and its detection by detector 16 is then measured by time interval unit 30. Such time interval may be stored or displayed as desired.

FIG. 2 is a simplified perspective view of a dipole acoustic logging device which may be used to log formations. As shown in FIG. 2, logging sonde 10 comprises a number of hollow cylindrical sections. The top section 32 contains a dipole acoustic logging source (not shown in FIG. 2) and has two oppositely situated windows 42 which allow the compressional waves generated by the dipole source to propagate radially therethrough into the borehole liquid. Sections 34, 36 each contains a detector (not shown). The two sections are located below section 32 and have windows 44, 46 as shown in FIG. 2. When the compressional waves generated by the dipole source in section 32 reach the borehole wall, they generate a dispersive dipole guided wave in the borehole liquid and a part of the formation adjacent to the borehole. Much of the energy of the guided wave is concentrated at and near the borehole liquid-borehole wall interface. In the formation, the guided wave amplitude attenuates rapidly with increasing distance away from the interface. The guided wave will travel along the borehole at the interface and in the borehole liquid to reach the detectors in sections 34, 36 through windows 44 and 46 respectively. The simplied perspective views of higher order multipole acoustic logging devices will appear similar to the dipole device shown in FIG. 2, except that each of the sections 32, 34 and 36 will preferably have more windows than two as shown in FIG. 2.

The nomenclature for the multipole is based upon consecutive powers of two, that is, $2^n$, n being an integer, and n=1, 2, 3 and on indefinitely. Thus the multipoles include the dipole (n=1), the quadrupole (n=2) and the octopole (n=3). The nomenclature for higher order multipoles is based upon $2^n$ with n=4, 5, 6 and so on indefinitely.

Figure 3:
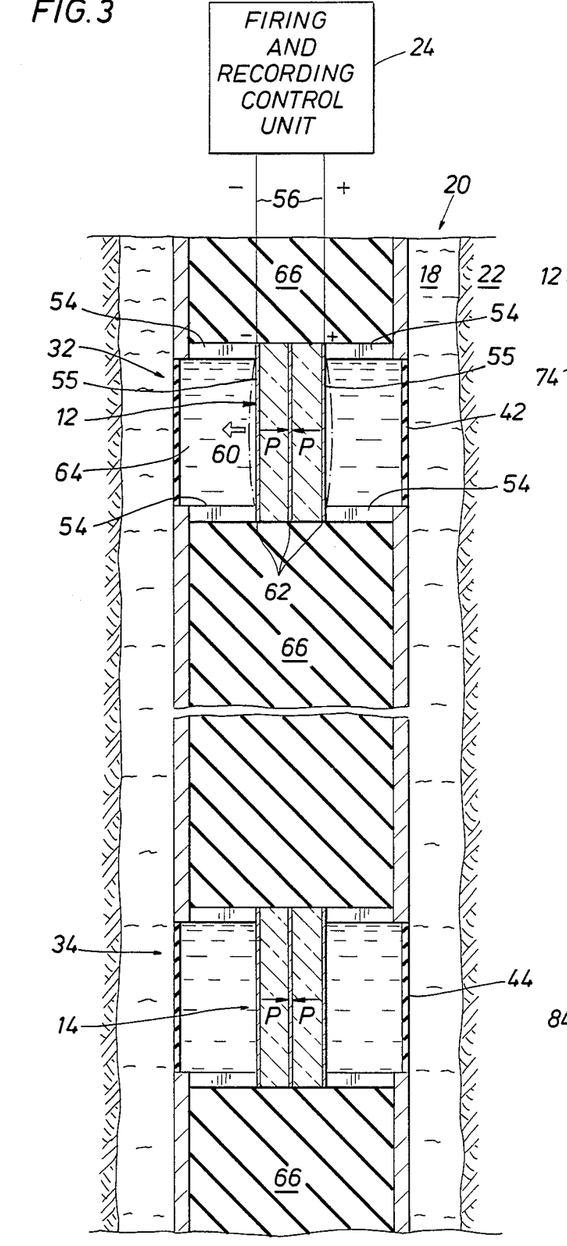
FIG. 3 is a partial cross-sectional view of a dipole acoustic device taken along the line 3—3 in FIG. 2.

FIG. 3 is a partial cross-sectional view of a dipole acoustic logging device taken along the line 3—3 in FIG. 2. As shown in FIG. 3, the dipole shear wave logging source 12 consists of a pair of elongated piezoelectric plates having two ends. The pair of plates are bonded together by their flat surfaces to form a composite plate 12. Each of the two plates is polarized substantially perpendicularly to its flat surface and the polarizations of the two plates are in substantially opposite directions. The composite plate is attached to the sonde by fitting both of its ends snugly between clamping plates 54 which are attached to the sonde. The clamping plates keep the composite plate in place while it is vibrating. The portion of the composite plate between the two ends which are clamped by clamping plates 54 will hereinbelow be called the "unclamped portion." The outside exposed flat surfaces of the composite plate 12 are coated by conducting layers 55, and are connected through such layers by wires 56 to the firing and recording control unit 24. The firing and recording control unit applies an electrical pulse across the composite plate 12. It is well known that if an electrical pulse is applied across the two flat surfaces of a plate member comprising a pair of oppositely polarized piezoelectric plates, it will cause the member to bend. If the polarity of the pulse applied is as shown in FIG. 3, the unclamped middle portion of elongated composite plate 12 will bend in the direction of hollow arrow 60 shown in FIG. 3. While in FIG. 3 the composite plates 12 are shown as clamped at both ends, it will be understood that, if the plates are each location clamped at only one end or at a location between the ends, the portions away from the point of clamping can be vibrated by electrical pulses in the same manner to generate a dipole guided wave in the borehole liquid. Such portions will herein be called the "unclamped portions."

The composite plate comprising the pair of oppositely polarized piezoelectric plates is readily available commercially. Piezoelectric composite plates supplied by the Vernitron Company of Bedford, Ohio, known as Bender Bimorphs have been satisfactory. The lateral space surrounding source 12 and enclosed by the cylindrical section 32 is filled by oil 64. The upper and lower portions of section 32 are filled by backing material 66 which preferably will have good damping qualities.

As shown in FIG. 3, detector 14 and section 34 are similar in construction to source 12 and section 32. The outside exposed conducting layers of detector 14 are connected to a band pass filter 26 (not shown in FIG. 3) instead of to a firing circuit. The band pass filter is then connected to an amplifier and a time interval unit as shown in FIG. 1. Detector 16 and section 36 (not shown in FIG. 3) are of the same construction as detector 14 and section 34 and are placed below detector 14.

Figure 4:
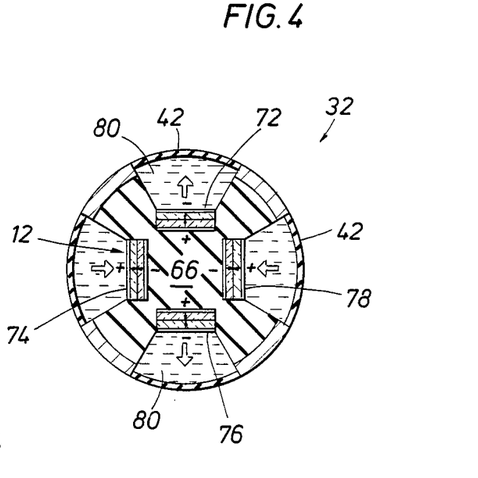
FIG. 4 is a cross-sectional view of a quadrupole acoustic logging source which may be used to log the shear wave velocity of a formation by logging the velocity of a guided wave.

FIG. 4 is a cross-sectional view of a quadrupole acoustic logging source which may be used to log the shear wave velocities of formations by logging the velocity of a guided wave. Instead of using only one elongated composite plate as in the dipole shear wave source illustrated in FIG. 3, the quadrupole shear wave source employs four such elongated composite plates 72, 74, 76, and 78 so spatially oriented that the four plates form substantially the four rectangular sides of an elongated cube. The four plates 72, 74, 76, 78 are attached to the logging sonde at both ends by two clamping plates, each clamping plate having four slots into which the ends of the four composite plates are fitted snugly. Section 32 of the quadrupole device has four windows 42 instead of two as shown in FIG. 2. The four plates are so spatially oriented that they face windows 42 as shown in FIG. 4. The sectorial spaces between the four plates and the four windows are filled by oil 80. The space between the four plates and the lateral sectorial spaces between the oil filled spaces are filled by a backing material 66 with good damping qualities.

Substantially the same electrical pulse signal is applied across each of the four composite plates. If the polarities of the electrical pulses so applied are as shown in FIG. 4 the unclamped portions of the four plates will bend and move in the directions of the four hollow arrows shown in FIG. 4. If the electrical pulses are applied to the four plates substantially simultaneously the four plates will bend and move substantially simultaneously to generate four compressional waves in oil 80. The four compressional waves will propagate through windows 42, borehole liquid 18 to reach the borehole wall. When the four compressional waves reach the borehole wall, they will generate a quadrupole guided wave in the borehole liquid. As in the dipole source, the four plates may be used in the same way to generate a quadrupole guided wave even if each is clamped at only one end instead of at both ends.

Figure 5:
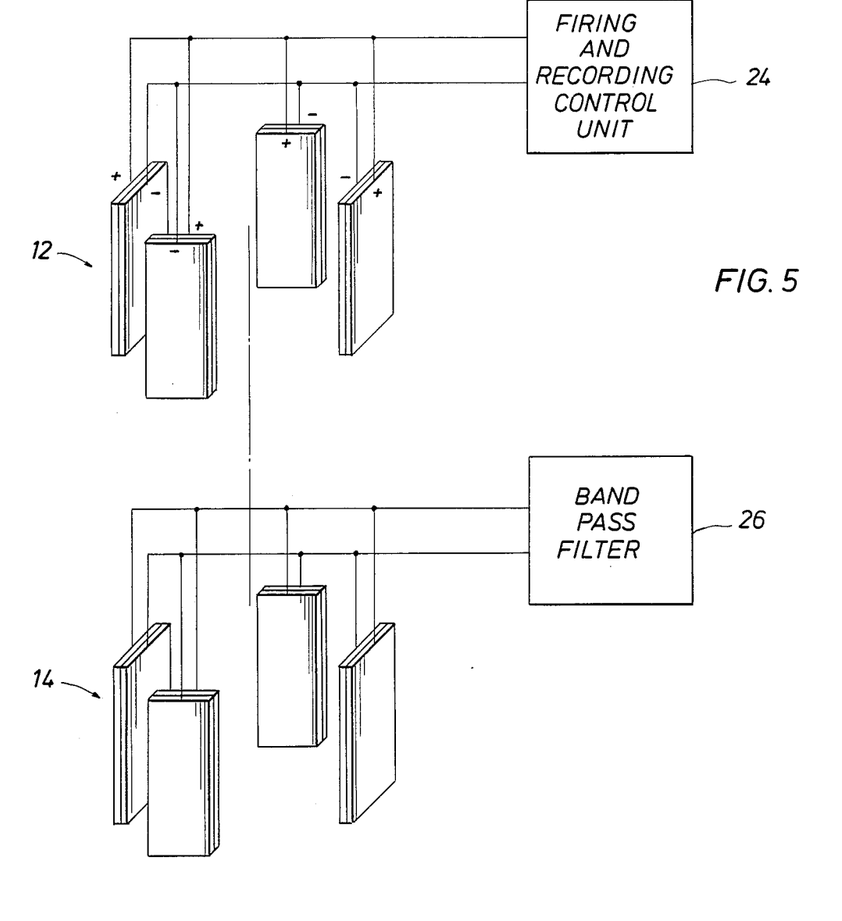
FIG. 5 is a simplified perspective view of the quadrupole acoustic logging device of FIG. 4 illustrating the orientation of the detectors relative to that of the quadrupole source, and the electrical connections to the source and detectors.

FIG. 5 is a simplified perspective view of the quadrupole acoustic logging device of FIG. 4 illustrating the orientation of the detectors relative to that of the quadrupole source, and the electrical connections to the source and detectors. To detect the quadrupole guided wave, detector 14 is preferably also a quadrupole detector of construction similar to source 12. The four composite plates of detector 14 preferably have the same spatial orientations relative to the borehole as those of source 12. The outside exposed surfaces of the four composite plates of detector 14 are connected to band pass filter 26 in a manner similar to the connections between the respective surfaces of source 12 and the firing and recording control unit 24. Another detector placed below detector 14 is similar to detector 14 but is not shown in FIG. 5 for simplicity. To allow the four plates of each of the two detectors to detect the quadrupole guided wave arrival, the sections containing the two detectors will each have four windows.

Figure 6:
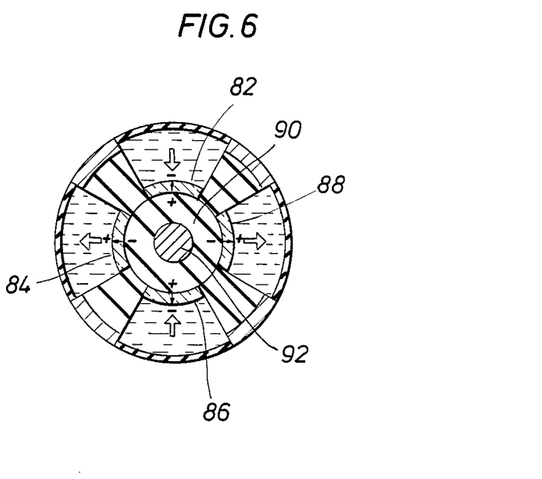
FIG. 6 is a cross-sectional view of another quadrupole acoustic logging source which may be used to log the shear wave velocity of a formation by logging the velocity of a guided wave.

FIG. 6 is a cross-sectional view of another quadrupole acoustic logging source which may be used to log the shear wave velocities of formations by logging the velocity of a guided wave. The source of FIG. 6 is similar in construction to the source of FIG. 4 except that instead of four composite piezoelectric plates, the source of FIG. 6 comprises substantially identical sectors 82, 84, 86 and 88 of a radially polarized piezoelectric hollow cylinder. The four sectors are so spatially arranged that they have substantially the same axis. The four sectors are placed on the outer cylindrical surface of an annular body 90 of backing material. Two elastic rings (not shown in FIG. 6) fitting snugly over the four sectors keep them in place during their vibrations. A mandrel 92 passes through body 90 and screws at both ends to two disks (not shown in FIG. 6) which fit snugly into section 32.

It is well known that when an electrical pulse is applied across the inner and outer cylindrical surfaces of each sector, the sectors will be caused to expand or contract radially. Unlike the source of FIG. 4 where only the unclamped portions of the composite plates will move, the entire sector will be caused to move inward or outward radially. If the four sectors are polarized radially outward and if substantially the same electrical pulse is applied to the four sectors substantially simultaneously with the polarities as shown in FIG. 6, sectors 82 and 86 will contract radially whereas sectors 84 and 88 will expand radially. The expansion and contraction of the four sectors will occur substantially simultaneously to generate four compressional waves. To detect the quadrupole guided wave arrival, the detectors used may be similar in construction to the quadrupole source of FIG. 6, or to the quadrupole source of FIGS. 4 and 5 described above.

Figure 7:
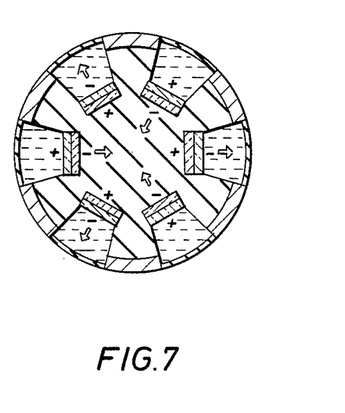
FIG. 7 is a cross-section view of an octopole acoustic logging source which may be used to log the shear wave velocity of a formation by logging the velocity of a guided wave.

FIG. 7 is a cross-sectional view of an octopole acoustic logging source which may be used to log the shear wave velocities of formations by logging the velocity of a guided wave. Six elongated piezoelectric composite plates are so spatially arranged that they form substantially the parallelograms of a hexagonal prism. As in the dipole and quadrupole sources of FIGS. 3, 4 and 5, each of the six composite plates comprises two oppositely polarized piezoelectric paltes bonded together and each composite plate is attached to the logging sonde by clamping plates. As in the firing of the dipole and quadrupole sources, substantially the same electrical pulse is applied across the flat surfaces of each of the six composite plates substantially simultaneously with polarities as shown in FIG. 7. The unclamped portions of adjacent composite plates will bend and vibrate in substantially opposite phases. The directions of the bending movements of the six composite plates are illustrated by hollow arrows in FIG. 7. The bending motion of each composite plate will generate a compressional wave in the borehole liquid. When the six compressional waves reach the borehole wall, they will generate an octopole guided wave in the borehole liquid. As in the dipole and quadrupole sources, the six plates may be used to generate an octopole guided wave even though each is clamped at only one end. To detect the octopole guided wave arrival in the borehole liquid, the detector used is preferably an octopole type which may be of similar construction to the octopole source illustrated in FIG. 7. The outer surfaces of the composite plates of detector 14 are connected to band pass filter 26 instead of to the firing and recording control unit 24. The three sections containing the octopole source and detectors corresponding to sections 32, 34, 36 of FIG. 2 will each having six windows instead of two.

Figure 8:
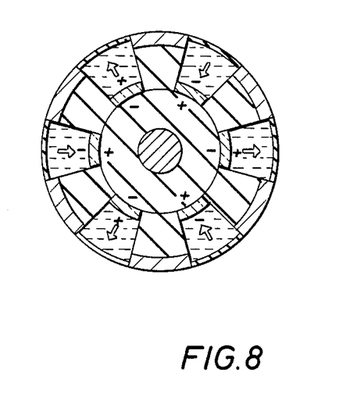
FIG. 8 is a cross-section view of another acoustic logging source which may be used to log the shear wave velocity of a formation by logging the velocity of a guided wave.

FIG. 8 is a cross-sectional view of an alternate octopole acoustic logging source which may be used to log the shear wave velocities of formations by logging the velocity of a guided wave. Six substantially similar sectors of a radially polarized piezoelectric hollow cylinder are so spatially arranged that they are substantilly coaxial. The six sectors may be attached to the sonde in a manner similar to that of the quadrupole source of FIG. 6. Substantially the same electrical pulse is applied across the cylindrical surfaces of each sector substantially simultaneously such that the pulses supplied to any two adjacent sectors are opposite in polarity. This arrangement is illustrated in FIG. 8. With such an arrangement, if one sector is caused by the electrical pulse to expand radially then the two adjacent sectors will contract radially. The directions of expansion and contraction are illustrated by hollow arrows in FIG. 8. The combined compressional waves so generated by the expansion and contraction of the six sectors will generate, upon hitting the borehole wall, an octopole guided wave in the borehole liquid. To detect the octopole guided wave arrival the detectors used may be of construction similar to the octopole acoustic source illustrated in FIGS. 7 or 8. The three sections containing the octopole source and detectors corresponding to sections 32, 34, 36 of FIG. 2 will each having six windows instead of two.

The higher order multipole sources may be constructed in a manner similar to the two embodiments of the octopole acoustic source illustrated in FIGS. 7 and 8. Thus the 16-pole source may be constructed by spatially arranging 8 elongated piezoelectric composite plates to form the 8 parallelograms of an octagonal prism. Substantially the same electrical pulse is applied to each of the eight composite plates with such polarity that adjacent plates vibrate in substantially opposite phases. An alternative embodiment of the 16-pole source is constructed if the eight composite plates are replaced by eight substantially identical sectors of a radially polarized piezoelectric hollow cylinder. Substantially the same electrical pulse is applied to each sector such that adjacent sectors vibrate in substantially opposite phases. Other higher order multipoles may be constructed in this manner. Preferably the detectors used to detect the higher order guided wave arrivals will be of an order that matches the order of the source.

The number of composite plates or sectors in the embodiments of the octopole and the 16-pole sources described above does not match the nomenclature of the octopole and 16-pole sources. Thus the octopole source comprises 6 plates or sectors and the 16-pole source 8 plates or sectors. The 32-pole source comprises 10 plates or sectors. Thus while the nomenclature of the multipole sources is based on $2^n$, n being an integer, with $n = 1, 2, 3 \ldots$, the corresponding number of plates or sectors is $2n$. Thus, a dipole ($n = 1$) source comprises $2 \times 1$ or 2 plates or sectors. A quadrupole ($n = 2$) source comprises 2×2 or 4 plates or sectors. An octopole (n=3), a 16-pole (n=4) and a 32-pole (n=5) source comprises 6, 8 and 10 plates or sectors respectively. Therefore, in general, a $2^n$-pole source will comprise $2n$ plates or sectors, n being an integer, where n=1, 2, 3 and so on indefinitely.

While the shear wave velocities of formations may be logged using the above described multipole sources and systems, it will be understood that the invention may be practised using other multipole acoustic systems or other acoustic systems as well.

To generate a guided wave, characterized in that its fastest component has the same velocity as the shear wave in the formation, the range of frequencies radiated by the multipole source must contain a certain critical frequency. For a dipole source the critical frequency f is approximately given by:

$$f = v/12a \, Hz$$

where a is the borehole radius and v is the shear wave velocity. For a quadrupole source the critical frequency is given approximately by:

$$f = v/4a \, Hz$$

For an octopole source the critical frequency is given approximately by:

$$f = 5v/12a \, Hz.$$

The shear wave velocity of the formation may be estimated by a conventional method such as measuring the compressional wave velocity of the formation. The shear wave velocity is approximately one-half the compressional wave velocity. The band widths of the guided waves generated by the multipole sources described earlier in the application are broad so that rough estimates of the shear wave velocities of the formation are adequate for determining whether the multipole source radiates at the critical frequency.

The split cylinder type source disclosed by White in U.S. Pat. No. 3,593,255 and the circular disc type source disclosed by Angona et al in European patent application No. 31989 may be used as dipole sources for generating and logging the fastest component of the guided wave which has the same velocity as the shear wave. The critical frequency that must be radiated by a dipole source is low for many types of formations encountered in oil and gas exploration. It is important that the design of the dipole source be suitable for radiating such low frequency. For this purpose, the elongated composite plate of the dipole source illustrated in FIG. 3 may be a more suitable design than the split cylinder design disclosed by White and the circular disc design disclosed by Angona et al.

The initial frequency that must be radiated by a multipole source is frequently low for many types of formations. The frequencies radiated by the $2^n$-pole type source comprising $2n$ sectors described above vary inversely with the radius of the sectors. Thus it may be desirable for the radius of the sectors to be large so that the source is capable of radiating at low frequencies. In the construction of such multipole source, it may be desirable for the radius of the sectors to be only slightly smaller than the radius of the logging sonde.

As discussed earlier, refracted shear waves cannot be logged directly where the shear wave velocity of the formation is less than sound velocity of the borehole liquid. Even if the shear wave velocity is equal to or slightly greater than the sound velocity in the borehole liquid, the shear wave arrival may still be low in amplitude and yield poor results for shear wave logging. In such circumstances the method of the invention may yield better measurements than methods in which refracted shear waves are logged directly.

The arrival of the fastest component of the guided wave may be logged on line (that is, the arrival can be picked out without data processing) if such arrival is significantly greater in amplitude than the compressional wave arrival. This will be the case when substantially all the frequencies radiated by the multipole source are within a preferred frequency range. The preferred frequency range of a dipole source is different from the preferred frequency range of a quadrupole source. In general, the preferred frequency range of a multipole of a particular order may be different from that of a multipole of a different order. The preferred frequency range of a multipole varies with the shear wave velocity of the formation to be logged. If the approximate shear wave velocity of a formation is estimated as described earlier, the preferred frequency range of the multipole can be chosen.

The above description of method and construction used is merely illustrative thereof and various changes in shapes, sizes, materials, or other details of the method and construction may be within the scope of the appended claims.

What is claimed is:

1. A method for acoustically logging an earth formation surrounding a borehole which contains a liquid where the approximate shear wave velocity v of the formation is known, said method comprising:

vibrating a dipole source in the liquid to generate in the liquid a guided wave the frequencies of which include a critical frequency f given by $$f = v12a$$

where a is the borehole radius, so that the fastest component of the guided wave has velocity substantially equal to v; and detecting the arrival of the fastest component of the guided wave at at least one location in the liquid spaced longitudinally along the borehole from the dipole source.

2. The method of claim 1 further comprising the step of measuring the time interval between the generation of the guided wave and the detection of the arrival of the fastest component of the guided wave.

3. The method of claim 1 wherein the arrival of the fastest component of the guided wave is detected at two locations in the liquid spaced longitudinally along the borehole from each other and from the source, said method further comprising the step of measuring the time interval between the detections of the arrival of the fastest component of the guided wave at the two locations.

4. A method for acoustically logging an earth formation surrounding a borehole which contains a liquid, wherein a dipole source comprising a housing and an elongated member attached to the housing at one location of the member is suspended in the liquid, and where the approximate shear wave velocity v of the formation is known, said method comprising:

vibrating an unattached portion of the member in a direction substantially perpendicular to its length to generate in the liquid a guided wave the frequencies of which include a critical frequency f given by $$f = v/12a$$

where a is the borehole radius, so that the fastest component of the guided wave has velocity substantially equal to v; and detecting the arrival of the fastest component of the guided wave at at least one location in the liquid spaced longitudinally along the borehole from the dipole source.

5. A method for acoustically logging an earth formation surrounding a borehole which contains a liquid where the approximate shear wave velocity v of the formation is known, and v is less than 5000 ft/sec, said method comprising:

vibrating a quadrupole source in the liquid to generate in the liquid a guided wave the frequencies of which include a critical frequency f given by $$f = v/4a$$

where a is the borehole radius, so that the fastest component of the guided wave has velocity substantially equal to v; and detecting the arrival of the fastest component of the guided wave at at least one location in the liquid spaced longitudinally along the borehole from the quadrupole source.

6. The method of claim 5 further comprising the step of measuring the time interval between the generation of the guided wave and the detection of the arrival of the fastest component of the guided wave.

7. The method of claim 5 wherein the arrival of the fastest component of the guided wave is detected at two locations in the liquid spaced longitudinally along the borehole from each other and from the source, said method further comprising the step of measuring the time interval between the detections of the arrival of the fastest component of the guided wave at the two locations.

8. A method for acoustically logging an earth formation surrounding a borehole which contains a liquid where the approximate shear wave velocity v of the formation is known, and v is less than 5000 ft/sec, said method comprising:

vibrating an octopole source in the liquid to generate in the liquid a guided wave the frequencies of which include a critical frequency f given by $$f = 5v/12a$$

where a is the borehole radius, so that the fastest component of the guided wave has velocity substantially equal to v; and detecting the arrival of the fastest component of the guided wave at at least one location in the liquid longitudinally along the borehole from the octopole source.

9. The method of claim 8 further comprising the step of measuring the time interval between the generation of the guided wave and the detection of the arrival of the fastest component of the guided wave.

10. The method of claim 8 wherein the arrival of the fastest component of the guided wave is detected at two locations in the liquid spaced longitudinally along the borehole from each other and from the source, said method further comprising the step of measuring the time interval between the detections of the arrival of the fastest component of the guided wave at the two locations.

* * * * *

UNITED STATES PATENT AND TRADEMARK OFFICE
CERTIFICATE OF CORRECTION

PATENT NO. : 4,774,693

DATED : September 27, 1988

INVENTOR(S) : Graham A. Winbow, et al.

It is certified that error appears in the above-identified patent and that said Letters Patent is hereby corrected as shown below:

In claim 1, column 10, line 40, delete "v12a" and substitute -- v/12a --.

In claim 8, column 12, line 24, insert -- spaced -- before "longitudinally."

Signed and Sealed this

Twenty-fifth Day of July, 1989

Attest:

DONALD J. QUIGG

*Attesting Officer*   *Commissioner of Patents and Trademarks*